April 12, 1966        S. W. BAKER        3,245,279
BALANCED GEAR TRANSMISSION
Filed Feb. 26, 1963        3 Sheets-Sheet 1
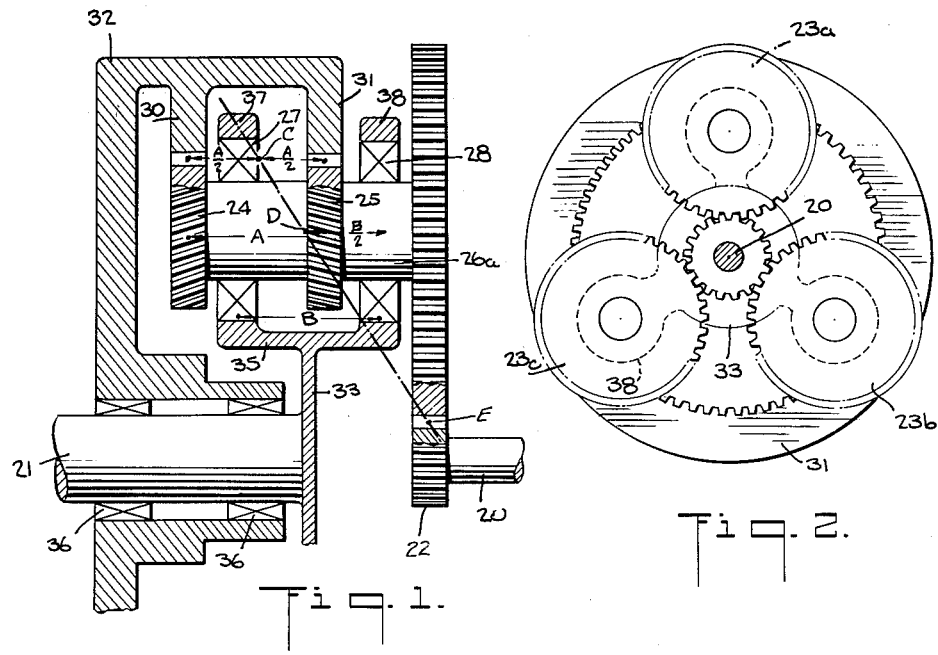
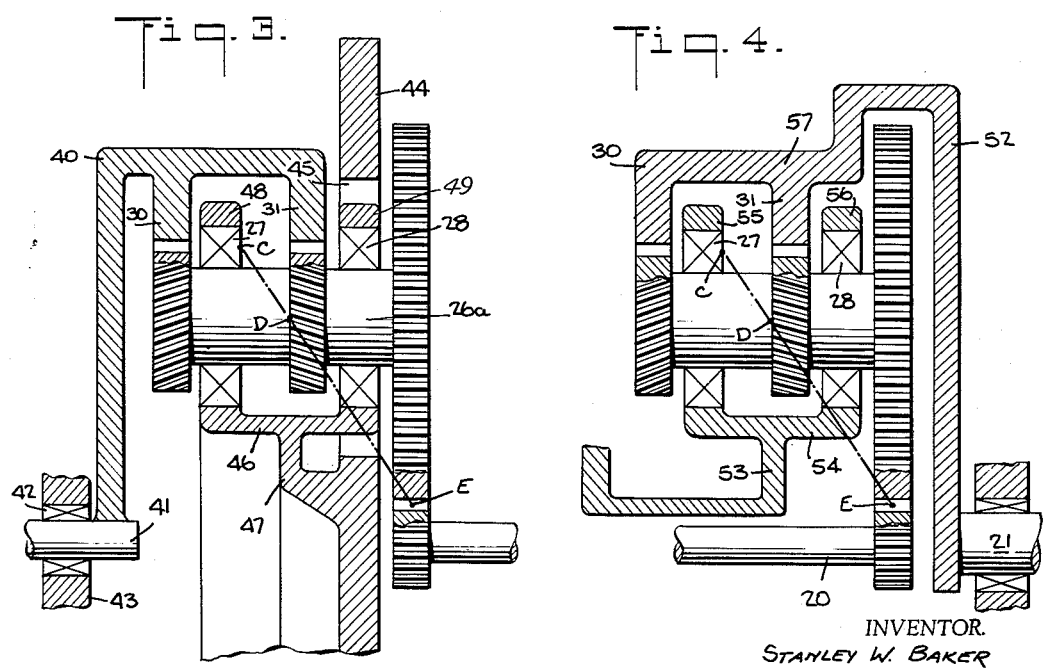
INVENTOR.
STANLEY W. BAKER
BY Frank G. Bauer
his ATTORNEY April 12, 1966     S. W. BAKER     3,245,279
BALANCED GEAR TRANSMISSION
Filed Feb. 26, 1963     3 Sheets-Sheet 2
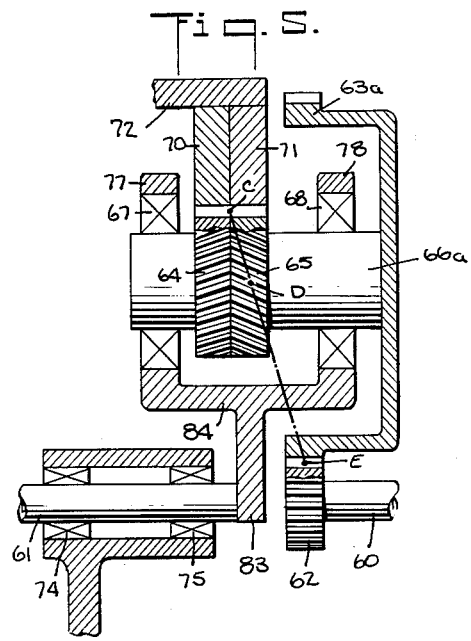
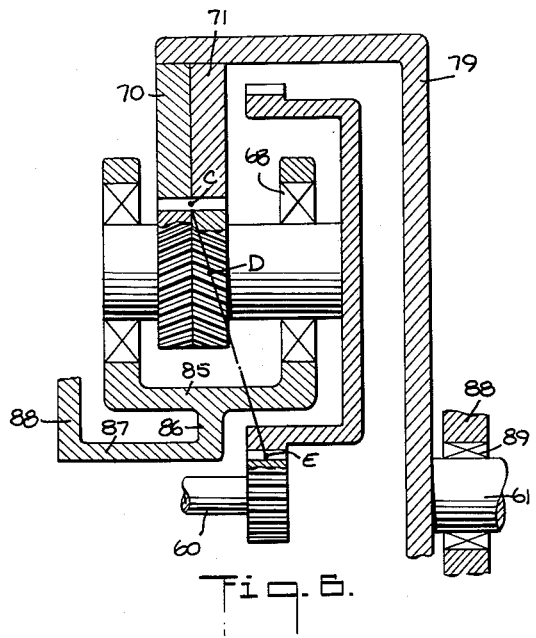
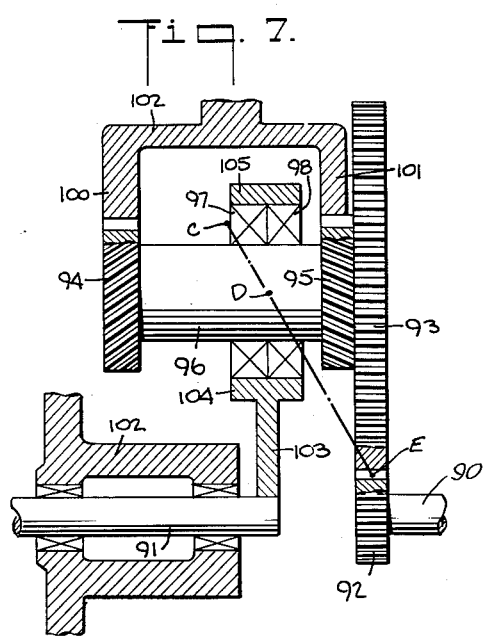
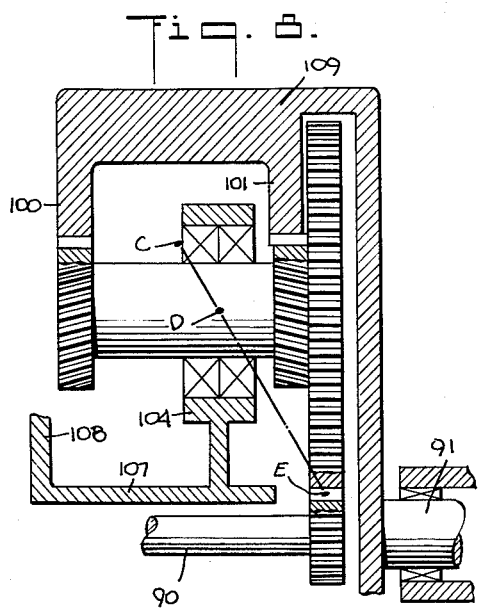
INVENTOR.
STANLEY W. BAKER
BY Frank A. Bower
his ATTORNEY April 12, 1966 S. W. BAKER 3,245,279
BALANCED GEAR TRANSMISSION
Filed Feb. 26, 1963 3 Sheets-Sheet 3
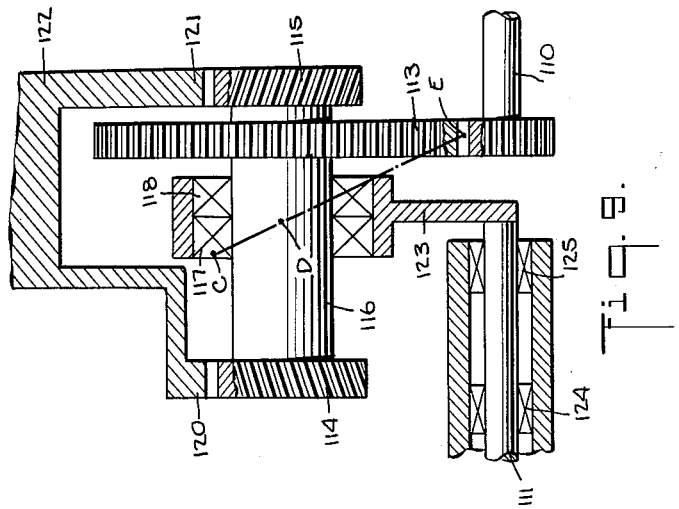
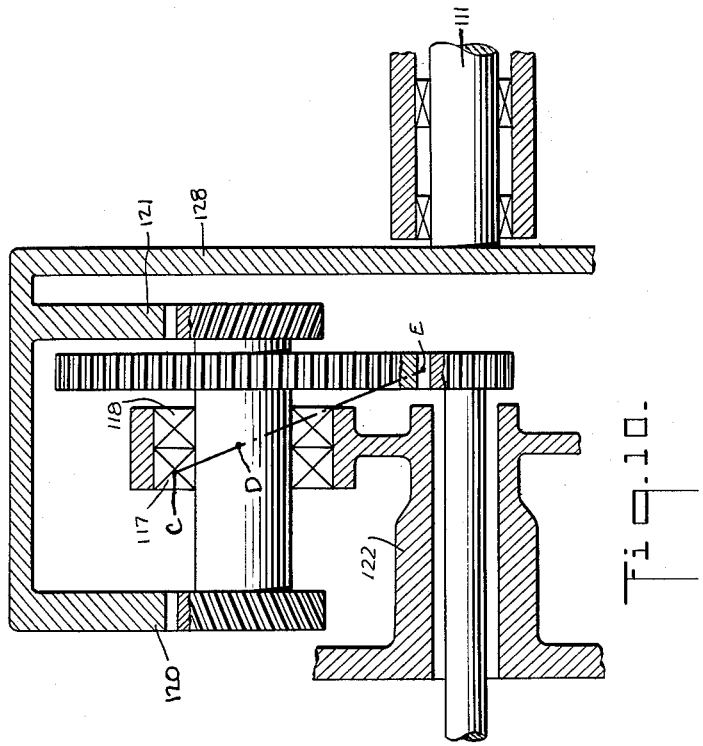
INVENTOR.
STANLEY W. BAKER
BY
Frank G. Bower
his ATTORNEY

United States Patent Office 3,245,279
Patented Apr. 12, 1966

3,245,279
BALANCED GEAR TRANSMISSION
Stanley W. Baker, Ramsey, N.J., assignor to Bergen Research Engineering Corporation, Teterboro, N.J., a corporation of New Jersey
Filed Feb. 26, 1963, Ser. No. 261,038
18 Claims. (Cl. 74—410)

This invention relates to gear transmissions and is directed particularly to gear transmissions having a higher input than output speed. The invention is directed particularly to planetary and star type of gears.

The gear transmissions used in aircraft and particularly in helicopters have to meet high standards. The weight of the transmission should be as low as possible and the reliability of performance should be as high as possible. These standards of low weight and high reliability are in conflict, since in order to secure reliability it is necessary to increase the size of the parts in the gear transmission, thereby reducing stresses. It is, therefore, desirable to provide gear transmission which reduces the size of the parts while maintaining a high standard of performance.

A factor affecting reliability is the number of parts in the gear transmission. The greater the number of parts, the lower the reliability of the transmission. In order to increase the reliability with a larger number of parts, the performance and reliability of the individual parts must meet higher standards than those in transmissions with fewer parts. This increases the production cost of the transmission. It is, therefore, desirable to attain a given speed and power change with a transmission having as few parts and stages of gear meshes permissible within good engineering practice.

Another factor affecting both reliability and weight is the ratio of the work transmitted by the parts to the work absorbed by the parts. The amount of work recirculated in the operation of the gear transmission increases the size and weight of the parts required and also increases the probability of failure. Also, the recirculated work requires an increase in size in order to accommodate the desired output requirements. It is, therefore, particularly desirable to reduce the forces or loads carried by the various fatigue life limited components, such as rolling contact bearing, so as to minimize the required size of the components as designed for a given possibility of failure or equivalent reliability index.

In some gear reduction systems, the number of parts multiplies the power loss, such as in regenerative reducers. In these types of transmissions the work done by the fatigue life limited members is a multiple of the actual power output. The parts carry the loads through multiple distances due to the differential motion aspects of the mechanism and the power loss is greater due to the additional work performed. As previously mentioned, in order to increase the life factor to proper limits the parts have to be increased in size to accommodate the extraordinary power rating transmitted.

A particularly desirable objective is to provide a gear transmission that is completely non-regenerative. Such a transmission has a higher efficiency with minimum weight for a desired operating life and may be attained by eliminating unnecessary work done by the transmission.

An object of this invention is to provide a gear transmission that has torsional load equalization, axial load equalization and bearing load equalization along with a symmetrical carrier torsional loading.

Another object of the invention is to provide a gear transmission with an over-all ratio in the range of 10:1 to 30:1 having a high reliability with a minimum number of parts and gear meshes at a minimal weight.

Another object of the invention is to provide a gear transmission of high reliability that has only two gear meshes in series with an over-all ratio in the range of 10:1 to 30:1.

The various embodiments of the invention are illustrated diagrammatically to emphasize and better illustrate the application of the principles of the invention. The detailed embodiment of the invention may be accomplished by utilizing well-known engineering designs of bearings, gearings, and gear transmission devices. Four basic arrangements adapted to various input and output drives are illustrated in the drawings in which FIG. 1 illustrates a planetary transmission with a sequence of pinion gear, bearing, pinion gear, bearing, planet gear with the output shaft coupled to the bearings;

FIG. 2 is an end view in reduced scale of the transmission of FIG. 1;

FIGS. 3 and 4 illustrate intermediate gear sets having a similiar sequence with the output shaft coupled to the ring gear carrier;

FIG. 5 illustrates a planetary transmission with the planet set having the sequence of bearing, double pinion gear, planet gear, bearing with the output shaft connected to the bearings;

FIG. 6 illustrates a transmission with the intermediate gear set having a similar sequence as that of FIG. 5 and the output shaft connected to the ring gear;

FIG. 7 illustrates a planetary transmission with the planet set having the sequence of pinion gear, double bearings, pinion gear, planet gear and the output shaft connected to the double bearings;

FIG. 8 is a transmission with the intermediate gear set having a similar sequence to the planet set of FIG. 7 and the output shaft connected to the ring gear;

FIG. 9 illustrates a planetary transmission having a planet sequence of pinion gear, double bearings, planet gear, pinion gear and the output shaft connected to the double bearings; and FIG. 10 illustrates a transmission with the intermediate gear set having a similar sequence to the planet set of FIG. 9 and with the output shaft connected to the ring gear.

The basic feature of each of the embodiments is to equally divide the input power supplied to a central or sun gear between intermediate gear or planet sets. Each of the planet or intermediate gear sets has two helical pinion gears for separately meshing with two ring gears, a large planet gear functioning as an intermediate gear and two supporting bearings. The gears of each set are fixedly mounted on a shaft or hub which is axially slidable in the bearings or by means of axially slidable bearing configuration to permit axial adjustment of the pinion gears to tooth pressures. The pinion gears or outer gear means mesh with two ring gears forming an outer mesh. The ring gears and pinion gears have equal oppositely angled helical teeth creating opposing axial components of the tooth pressures on the pinion gears. The central or sun gear and the spur gear on the planet or intermediate gear means form an inner mesh and have straight teeth to permit free axial movement. The axial movement maintains these components equal and thus the tooth pressures equal. The power transmitted is thus equally divided into six parallel paths to the ring gear carrier or ring gear in case of three planet or intermediate gear sets as illustrated in FIG. 2.

The sun or central spur gear is mounted on an input shaft having a low lateral spring rate permitting the shaft to respond to radial forces on the gear. Any overengagement with one planet gear will create tooth pressures forcing the sun gear against the other gears. Thus the transmitted power is divided equally between the planet or intermediate gear sets. The bearings supporting the pinion and intermediate gear sets are provided in pairs. The bearing pairs are intermediately supported to center or equalize the loads between the bearings of a respective pair and apply the bearing loads without net moment to the bearing support.

For each planet set the load point between the areas of tooth contact of the pinion gears with the ring gears and the load center of the contact area of the central spur gear with the corresponding planet or intermediate gear are positioned on opposite sides of the center of the bearing pair of the respective set, with the bearing pair center being in the same straight line containing the midpoint of the areas of contact of the pinion gears and the center of the areas of contact of the sun gear and planet gear. This arrangement places the center of the bearing pair at the zero moment position between the forces acting on the pinions and planet or intermediate gear sets, thereby providing equalized bearing loads and zero net moment on the bearing support structure due to the main gear power transmitting forces.

The power is delivered to the transmission through the input shaft with the sun or central spur gear engaging the spur gear of the intermediate set. The opposed helical pinion gears engage the ring gears with the resultant force effectively located midway between the gears. This outer gear mesh load point combined with the inner gear mesh load point at the sun or central gear is disposed to always oppose the total reaction force at the midpoint between the bearings. This total reaction force applied to the bearings is divided equally and the equal distribution under load application maintained by providing a symmetrically disposed elastic mounting of the bearings around a mid-supporting member. Thus as the amount of power delivered is varied, the planet or intermediate gear set centerline axis relationship remains constantly parallel to the centerline axis of the entire transmission. The pressure applied to the bearings is thus equalized and consistently related to the input power.

As previously indicated in the brief description of the figures of the drawing, four different sequences of the pinion gears, bearings and spur or intermediate gear form the desired moment relationship.

*Pinion, bearing, pinion, bearing, planet*

Referring to FIGS. 1 through 4, the input drive is supplied through the shaft 20 and the output of the drive is taken from the shaft 21. The shaft 20 has a spur gear 22 engaging three cylindrically spaced planet or spur gears 23a, 23b, 23c. The pinion gears 24 and 25 are mounted on the hub or shaft 26a. For purposes of illustration only one set of planet and pinion gears is shown. However, planet gears 23b and 23c are similar in structure to that of 23a. The shaft 26a supporting the gears 23a, 24 and 25 is rotatably mounted in bearings 27 and 28. The pinion gears 24 and 25 are spaced to engage ring gears 30, 31. These ring gears are attached side by side to the casing 32 in a fixed nonrotating position. The bearings 27 and 28 are mounted in blocks 37, 38 on opposite edges of the rim 35 attached to the output shaft 21 by the support disc 33. The output shaft 21 is rotatably mounted in bearings 36. The input shaft is supported and driven at the other end from the sun gear 22 a distance from the sun or central spur gear and in a manner to provide a low lateral spring rate.

The bearings 27 and 28 and the pinion gears 24 and 25 are related to the center of the application of force between the sun gear 22 and the planetary gear 23a in a particular manner so as to equalize the loads and forces on the gears and bearings. The centers of the gears 24 and 25 are longitudinally or axially spaced a distance A and the centers of the bearings 27 and 28 are spaced a distance B. The gears and bearings are related so that the resultant meshing point or load center C and the bearing midpoint D are in line with resultant meshing point E.

The teeth of the central gear 22 and the teeth of the planet or spur gears are straight so there is no axial restraint applied to axial forces on the intermediate gear set.

The gears 24 and 25 have helically sloped teeth facing one another or facing away from one another meshing with corresponding teeth on the ring gears. The hub 26a is slideably mounted in the bearings 27 and 28 to permit an axial movement of the pinion gearing. The bearings due to their inherent structure may also permit an axial movement of the pinion gear ring. Since there is no axial restraint by the central spur gear and intermediate gear when either gear 24 or the gear 25 assumes a greater portion of the load, there will be a slight axial shift so that the load will be equalized between the gears 24 and 25. Thus the load point C or center remains midway between the gears 24 and 25.

The gears 24 and 30, gears 25 and 31 and gears 22 and 23a in transmitting torque are in proper meshing relation. The load on the bearings 27 and 28 are equal. The combined resultant is in the plane of disc 33 and applied without moment. As the torque is increased or decreased the proper meshing relation is maintained. The axis of the shaft 26a stays parallel to the central axis of the transmission over the range of the applied torque. With the center of the bearings in line with or in the plane of the disc or mid-supporting member 33, there is no twisting or tilting moment to produce an angular tilting of the axis and change in the meshing of the gears. There may be a very slight shifting of the axis but it remains parallel in its various positions.

The generally T-shaped cross section formed by the radially extending support disc 33 and the circumferentially extending rim 35 positions the bearings on opposite sides of the disc 33 with the center of the bearings in line with the disc to equalize the load between the bearings 27 and 28 so that each bearing carries substantially half of the load.

In FIGS. 3 and 4 the output shaft is connected to the ring gears 30 and 31 instead of through the bearing support. In FIG. 3 the ring gears 30, 31 are mounted on the rotating carrier 40 attached to the output shaft 41. The shaft is mounted in the bearing 42, which is in turn held by the fixed casing 43. A partition 44 extends between the spur gears and the pinion gears and is attached to the casing 43 for a firm mounting. Openings, as illustrated at 45, are provided for the hub 26a and the bearing 28. The rim member 46 is centrally supported at its midpoint by a flange 47 attached to the partition 44. The rim and flange extend circumferentially with the rim having blocks 48, 49 for holding the bearings 27 and 28.

In FIG. 4 the position of the input shaft 20 is reversed. The casing 52 supports the fixed disc member 53 supporting a rim 54. Rim 54 has blocks 55, 56 supporting the bearings 27 and 28. The output shaft 21 is also reversed and the rotating carrier 57 is attached thereto and has the ring gears 30 and 31.

In each of these latter embodiments the midpoints C and D between the pionion gears and the bearings, respectively, and the center E of the spur and central spur gear are in line.

*Bearing, double pinion, spur, bearing*

In FIGS. 5 and 6 the set sequence is bearing, double pinion gears, spur gear and bearing. In this arrangement the pinion gears are positioned between the bearings.

Referring to FIG. 5, input shaft 60 has a low lateral spring rate and a sun gear 62 on the free end thereof engaging three planet or spur gears, only one of which is illustrated in the drawing. The output shaft 61 is mounted in the bearings 74, 75. The planetary gear 63a has a cup shape. The pinion gears 64 and 65 are mounted on the hub 66a in side by side relation, as illustrated. The bearings 67 and 68 are on opposite sides of the pair of pinion gears to rotatably and slideably support the hub 66a. The pinion gears 64, 65 and ring gears 70, 71 have oppositely aligned helical teeth to produce opposing forces so as to equalize the torque transmission between the pinions to the ring gears 70, 71. The ring gears are mounted on the casing 72. The bearings 67 and 68 are mounted in blocks 77 and 78 which are intermediately supported by the radial piece 83 with a rim 84. The planet gear 63a is cup-shaped to position the center point E of engagement of planet gear 63a and sun gear 62 in line with the midpoint D between the bearings and the center of pressure C of the gears 64, 65.

In FIG. 6 the ring gears 70, 71 are coupled to the output shaft 61 by means of the carrier 79 extending circumferentially and axially around the intermediate gear sets. The bearings 67, 68 are mounted on opposite ends of the circumferential rim 85 intermediately supported by the disc member 86. The disc member 86 is attached to the casing 88 by the tubular member 87 encircling the low lateral spring rate input shaft 60. The output shaft 61 is supported by bearing 89 in the casing 88.

*Pinion, double bearing, pinion, spur*

In FIGS. 7 and 8 the planet sets have the sequence pinion gear, double bearing, pinion gear, spur. The input shaft 90 has sun gear 92 engaging the planet gear 93 (FIG. 7). The pinion gears 94 and 95 are mounted on the hub 96 and engage the ring gears 100 and 101. The hub 96 is rotatably mounted in the bearings 97 and 98. The output shaft 91 has a disc member 103 with a rim 104 supporting the bearing block 105. The output shaft is mounted in bearings in the casing 102 which also supports the ring gears. As illustrated, the midpoint C of the pinion gears, the midpoint D of the bearings and the center E of the meshing sun gear tooth are in the same line so that equalized forces are placed on the bearings 97 and 98.

In FIG. 8 the input shaft 90 extends in the opposite direction to the arrangement of the intermediate gear set and the output shaft 91 is coupled to the ring gears 100, 101 by means of the carrier 109 extending circumferentially and axially around the outside of the transmission. The input shaft 90 extends through the tubular member 107 attached to the casing 108 and supporting the bearings by means of the disc member 106 intermediately supporting the rim 104 on which the bearings are mounted. The centers and midpoints C, D and E are aligned for maintaining the balance of the forces.

*Pinion, double bearing, spur, pinion*

In the embodiments of FIGS. 9 and 10 the sequence of the planet sets is pinion gear, double bearings, spur gear and pinion gear. The ball bearings 117, 118 are side by side in close relationship rotatably supporting the hub or shaft 116. The pinion gears 114 and 115 are spaced apart with the planet gear 113 (FIG. 9) between the pinion gear 115 and the double bearings to provide the alignment of the pinion tooth pressure midpoint, gear center and center of tooth pressure of the planet and sun gear.

In FIG. 9 the low lateral spring rate input shaft 110 extends from the sun gear on the side opposite of the planet gear from that of the double bearing, whereas in the star gear embodiment of FIG. 10 the input shaft is on the same side of the planet gear as the double bearings.

In the planetary embodiment of FIG. 9 the output shaft 111 is supported in bearings 124 and 125 in the casing 122. The output of the transmission is taken through the double bearings 117 and 118 symmetrically mounted in connection with the supporting radial disc member 123 attached to the output shaft 111. The pinions 114 and 115 mesh with the ring gears 120 and 121 and have equal oppositely angled helical teeth for adjusting the pinion gears and the hub 116 in the bearings 117, 118. The ring gears 120, 121 are fixedly mounted on the casing 122.

In the star gear embodiment of FIG. 10 the output shaft 111 rotatably supports the ring gears 120, 121 by means of the carrier 128 extending circumferentially around the transmission. The bearings 117, 118 are fixedly supported in the casing 122. As illustrated in FIGS. 9 and 10 the midpoint C, center D and center E are aligned and the bearings 117, 118 symmetrically load the bearing support so that the torque and loads are balanced over the range of input power.

The lateral or radial responsive engagement of the input central spur or sun gear with the planet or spur gears equalizes the forces between the planet gears so that the torsional load is equalized between the planet gears. At least two or more planet or intermediate systems or sets are provided and, as illustrated in the embodiments, three planet sets are preferred. Thus the transmitted load or power is equally divided into three parts. The planet or intermediate sets are provided with pinion gears having oppositely angled helical teeth which engage gears having oppositely angled helical teeth to produce axial forces on the respective pinion shafts. The load transmitted or carried by each pinion gear is thus equalized, and in the case of three planet sets six parallel transmission gears are provided at the reaction or output gear mesh. This equalization further equalizes the tooth pressure so that the center of tooth pressure is located at a midpoint between the pinion gears. Each of the pinion shafts is supported by two bearings. The bearings are positioned so that the center of the bearings is on a straight line between the midpoint of the pinion gear mesh and the center of the sun gear and planet gear mesh, with these midpoints and centers aligned. This center of the bearing corresponds to the center of zero moment of the forces transmitted between the meshing gears. Over the range of transmitted power, these centers are retained in correspondence and thus substantially only equalized tangential forces are applied to the bearings and there is no thrust force, moment or bearing load unbalance created in the pinion shafts. This restriction of the forces to the bearings and the balancing of the forces between the two bearings maintain the load carried by the bearings to the minimal amount required for the power transmitted. There is no overloading of either of the bearings due to unbalance being created by the application of power to the transmission. The bearings, therefore, may be of the roller or sleeve type having no axial restraint capability and designed with minimum weight and low bearing frictional characteristics.

Further, the equalization or the balancing of the torque loads between the bearings balances the forces applied to the carrier at the bearing support. Thus the carrier, which is primarily a structural member, is minimal in weight since it is subjected to pure torque and does not require extra sectional modulus to minimize the deflection due to unbalanced loads applied at the bearings. The torque load applied by the outer bearing race is balanced about the carrier or support so that there is a zero net moment thereon.

The power output may be taken through the bearings or through the ring gears. In either case the axial loads are negligible. As previously described in connection with the bearings and with the ring gears, the oppositely angled helical teeth cancel the axial loads on the ring gear carrier.

It is seen from the embodiments that only two gear meshes are in series, thus minimizing the multiplication of any power losses. The elimination of unbalancing loads reduces the weight of the transmission to a minimum for the power transmitted without sacrifice in reliability or quality of the various parts of the transmission. Further, the width of the gear teeth is maintained within good engineering practices for the uniform load distributions across the face of the teeth.

The transmission has high efficiency and minimum weight for a desired operating life and is completely non-regenerative. The gears and bearings perform only the work required to accomplish the desired speed reduction and torque multiplication. The power loss is only that fraction of the transmitted power normally to be expected, rather than some multiple thereof as in the case of regenerative reducing transmissions.

In the embodiments described half of the embodiments have the ring gears stationary with the bearings rotating and carrying the output torque, and in the other embodiments the bearings are stationary and the ring gears rotate to carry the output torque. From the practical design aspects for high speeds the latter embodiments are preferred so that the bearings are not subjected to the excessive centrifugal forces that would be generated. These centrifugal forces create added wear and increase the size of the components without increasing the capacity of the transmission to carry torque loads.

In the foregoing description the reaction or output gear has been an outer ring gear. However, the reaction or output gear may be an inner gear. In such a modification the axial sequence of the center of mesh of the pinion gears, the center of the bearings and the center of mesh of the planet and sun gear is maintained but is not aligned. However, the loads on the bearings are balanced. A range of reduction from 10:1 through 30:1 may be attained by the various embodiments illustrated by changing the diameters of the gears.

Various other modifications and changes may be made without departing from the invention as set forth in the appended claims.

I claim:

1. A gear transmission comprising a shaft having spur gear means, outer gear means with oppositely angled helical teeth, at least two intermediate gear sets and corresponding bearing means, each set slideably supported for axial movement in a respective bearing means to respond to axial forces applied to said respective intermediate gear set, each of said intermediate gear sets having pinion gear means with oppositely angled helical teeth engaging said teeth of said outer gear means to respond to axial forces to maintain the center of the area of tooth contact at the midpoint of said main and pinion gear means and having an intermediate gear means engaging said spur gear means with the center of tooth pressure of said intermediate gear means and said spur gear means on the opposite side of the center of the bearing means from the midpoint of said pinion gear means so that the center of zero moment of the forces of said gear means substantially coincides with the center of said bearing means to equalize the load transmitting forces applied to the bearing means.

2. A gear transmission as set forth in claim 1 wherein each of said bearing means corresponding to an intermediate set comprises two bearings, and means for symmetrically supporting said bearings with the radial forces transmitted by said support means radially in line with the center point between the two bearings to distribute the loads applied to said two bearings substantially evenly.

3. A gear transmission as set forth in claim 2 wherein said supporting means comprises a longitudinally extending member and a radial member intermediately supporting said longitudinally extending member with said bearings mounted on said longitudinally extending member on opposite sides of said radial member.

4. A gear transmission comprising a low radial spring rate input shaft having a central spur gear at the free end thereof, at least two intermediate gears engaging said central spur gear equally distributing the torque transmitted to said intermediate gears by responding to differences in tooth pressures, said intermediate gears each having a pinion shaft with two pinion gears, two ring gears for engaging a respective pinion gear on each pinion shaft, said ring gears and said pinion gears having oppositely angled helical teeth creating opposite axial forces on said pinion shaft, at least two pairs of bearings rotatably and slideably supporting for axial movement a respective pinion shaft to permit said pinion gears to respond to differences in tooth pressures for equalizing the power transmitted, mounting means supporting said pairs of bearings, said pinion gears, intermediate gears and pinion shaft in rotatable relation to said ring gears to maintain the center of bearing load between the bearings of a respective pair, said bearings and gears relatively positioned to locate the load center of the pinion gear area of contact and the center of the area of contact of the central spur gear and intermediate gear on opposite sides of the center point between the two bearings and in an aligned relation to correspond the center of zero moment of the forces transferred with the center of said bearings to maintain over the power range the location of application of forces applied to the bearings substantially constant and balanced between the bearings of a respective pair of bearings.

5. A gear transmission comprising an output shaft having radial mounting means, a low radial spring rate input shaft having a sun gear at the free end thereof, at least two planet gears engaging said sun gear equally distributing the torque transmitted to said planet gears by responding to differences in tooth pressures, said planet gears each having a pinion shaft with two pinion gears, two fixed ring gears for engaging a respective pinion gear on each pinion shaft, said ring gears and said pinion gears having oppositely angled helical teeth creating opposite axial forces on said pinion shaft, at least two pairs of bearings rotatably and slideably supporting for axial movement a respective pinion shaft to permit said pinion gears to respond to differences in tooth pressures for equalizing the power transmitted, said radial mounting means supporting said pairs of bearings on said output shaft to rotate said pinion gears, planet gears and pinion shaft thereabout responding to maintain the center of bearing load between the bearings of respective pair, said bearings and gears relatively positioned to locate the midpoint between the pinion gear area of contact and the center of the area of contact of the sun and planet gear on opposite sides of the center point between the two bearings and in an aligned relation to correspond the center of zero moment of the forces transferred with the center of said bearings to maintain over the power range the location of application of forces applied to the bearings for rotation of the output shaft substantially constant and balanced between the bearings of a respective pair of bearings.

6. A gear transmission as set forth in claim 5 wherein the sequence of said bearings, pinion gears and planet gear is pinion gear, bearing, pinion gear, bearing, planet gear.

7. A gear transmission as set forth in claim 5 wherein the sequence of said bearings, pinion gears and planet gear is bearing, pinion gear, pinion gear, planet gear, bearing.

8. A gear transmission as set forth in claim 5 wherein the sequence of said bearings, pinion gears and planet gear is pinion gear, bearing, bearing, pinion gear, planet gear.

9. A gear transmission as set forth in claim 5 wherein the sequence of said bearings, pinion gears and planet gear is pinion gear, bearing, bearing, planet gear, pinion gear.

10. A gear transmission comprising a rotatably supported output shaft, a low radial spring rate input shaft having a central spur gear at the free end thereof, at least two intermediate gears engaging said central spur gear equally distributing the torque transmitted to said intermediate gears by responding to differences in tooth pressures, said intermediate gears each having a pinion shaft with two pinion gears, two ring gears mounted on said output shaft to rotate therewith and engaging a respective pinion gear on each pinion shaft, said ring gears and said pinion gears having oppositely angled helical teeth creating opposite axial forces on said pinion shaft, at least two pairs of bearings rotatably and slideably supporting a respective pinion shaft to permit said pinion gears to respond to differences in tooth pressures for equalizing the power transmitted to maintain the center of the area of contact of the teeth at the midpoint between the pinion gears on a respective shaft, said bearings and gears relatively positioned to locate the load center of the pinion gear area of contact and the center of the area of contact of the central spur gear and intermediate gear on opposite sides of the center point between the two bearings and in an aligned relation to correspond the center of zero moment of the forces transferred with the center of said bearings to maintain over the power range the forces applied to the bearings substantially constant and balanced between the bearings of a respective pair.

11. A gear transmission as set forth in claim 10 wherein the sequence of said bearings, pinion gears and intermediate gear is pinion gear, bearing, pinion gear, bearing, intermediate gear.

12. A gear transmission as set forth in claim 10 wherein the sequence of said bearings, pinion gears and intermediate gear is bearing, pinion gear, pinion gear, intermediate gear, bearing.

13. A gear transmission as set forth in claim 10 wherein the sequence of said bearings, pinion gears and intermediate gear is pinion gear, bearing, bearing, pinion gear, intermediate gear.

14. A gear transmission as set forth in claim 10 wherein the sequence of said bearings, pinion gears and intermediate gear is pinion gear, bearing, bearing, intermediate gear, pinion gear.

15. A torque transmitting mechanism comprising an inner gear means, an outer gear means, an intermediate gear means meshing with said inner gear means and said outer gear means, said intermediate gear means having pinion gear means in an outer mesh with said outer gear means including means on said pinion gear means and said outer gear means for creating opposing axial forces and said intermediate gear means having spur gear means in an axial free inner mesh with said inner gear means permitting said intermediate gear means to respond to the opposing axial forces, supporting means having bearing means rotatably holding said intermediate gear means axially free to balance the opposing forces and with the center of the bearing means in line with the resultant meshing points of the inner and outer meshes and in substantial alignment with the supporting means to apply the bearing load without substantial net moment to the supporting means thereby maintaining the alignment of the inner and outer meshes substantially constant over the range of transmitted torque.

16. A gear transmission comprising a central spur gear, a pair of outer ring gears having teeth for creating forces in opposition between said gears, a torque transmitting rotary shaft having a single spur gear meshing with said central spur gear and having a pair of pinion gears having teeth for creating forces in opposition meshing with said pair of outer ring gears to create opposing axial forces, said pair of gears on said shaft axially movable in unison solely in response to forces transmitted between said meshing pairs to maintain the resultant point of engagement of said gears at a given point between the pairs of pinion gears and supporting means having bearing means rotatably supporting said shaft on opposite sides of the supporting means with the center of the bearing means in line with the resultant points of mesh of the gears for applying to the supporting means the resultant of the forces on the bearing means without substantial net moment to maintain the position of the axis of the shaft parallel under torque transmitting conditions.

17. A gear mechanism for transmitting torque having a main axis comprising an input spur gear centered on the main axis, two output ring gears concentric to the main axis, a pinion set drivingly connecting said input gear and said ring gears, said pinion set comprising a shaft, an intermediate gear and two pinion gears, two bearings rotatably supporting said shaft about an axis parallel to the main axis, a support having a central member midway between said bearings and arms extending on opposite sides thereof to support said bearings placing the center of said bearings in line with the resultant load center of mesh of said pinion gears with said ring gears and the load point of the mesh of said intermediate gear and said input gear so that the forces applied to said bearings by the pressure of said gears is equalized between the bearings and in line with the central portion to maintain the shaft axis parallel to the main axis and the gears in proper mesh under torque transmitting conditions.

18. A torque transmitting mechanism comprising an inner gear means, an outer gear means, an intermediate gear means having first gear means in an axial free inner mesh with said inner gear means forming an inner resultant meshing point therewith and having second gear means in an outer mesh with said outer gear means forming an outer resultant meshing point therewith, supporting means having bearing means rotatably holding said intermediate gear means with the center of the bearing means in line with the resultant meshing points of the inner and outer meshes, said intermediate gear means having balancing means for axially maintaining the resultant meshing points of the inner and outer meshes at substantially the same location, said supporting means being in substantial alignment with the center of the bearing means to apply the bearing load without substantial net moment to the supporting means thereby maintaining in combination with said balancing means the alignment of the resultant meshing points of the inner and outer meshes with the center of the bearing means substantially constant over the range of transmitted torque.

References Cited by the Examiner

UNITED STATES PATENTS

| | | | |
|---|---|---|---|
| 1,859,462 | 5/1932 | Perkins | 74—801 |
| 1,968,604 | 7/1934 | Hertz et al. | 74—801 |
| 2,703,021 | 3/1955 | Stoeckicht | 74—801 X |
| 2,712,761 | 7/1955 | Chung | 74—410 |
| 2,995,046 | 8/1961 | Mansachs | 74—410 |
| 3,034,369 | 5/1962 | Marchand | 74—410 |
| 3,090,258 | 5/1963 | Zink et al. | 74—410 X |

DON A. WAITE, *Primary Examiner.*